(12) United States Patent
Suzuki et al.

(10) Patent No.: US 12,152,550 B2
(45) Date of Patent: Nov. 26, 2024

(54) ENGINE CONTROLLER, ENGINE CONTROL METHOD, AND STORAGE MEDIUM

(71) Applicant: TOYOTA JIDOSHA KABUSHIKI KAISHA, Toyota (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/334,102

(22) Filed: Jun. 13, 2023

(65) Prior Publication Data

US 2023/0407810 A1 Dec. 21, 2023

(30) Foreign Application Priority Data

Jun. 16, 2022 (JP) .................................. 2022-097196

(51) Int. Cl.
*F02D 41/40* (2006.01)
*F02D 41/38* (2006.01)

(52) U.S. Cl.
CPC ...... *F02D 41/401* (2013.01); *F02D 2041/389* (2013.01); *F02D 2200/0602* (2013.01)

(58) Field of Classification Search
CPC ............. F02D 41/401; F02D 2041/389; F02D 2200/0602
See application file for complete search history.

(56) References Cited

U.S. PATENT DOCUMENTS

| | | | | |
|---|---|---|---|---|
| 11,698,040 B1* | 7/2023 | Arisawa | ................ | F02D 41/401 |
| | | | | 123/491 |
| 2012/0111302 A1 | 5/2012 | Shishime et al. | | |
| 2015/0059686 A1* | 3/2015 | Glugla | .................. | F02D 41/402 |
| | | | | 123/445 |

FOREIGN PATENT DOCUMENTS

| | | |
|---|---|---|
| JP | 2012-102654 A | 5/2012 |
| JP | 2012-122404 A | 6/2012 |
| JP | 2012-189061 A | 10/2012 |
| JP | 2012-211542 A | 11/2012 |
| JP | 2016-130473 A | 7/2016 |
| JP | 2022-078786 A | 5/2022 |

* cited by examiner

*Primary Examiner* — Kevin A Lathers
(74) *Attorney, Agent, or Firm* — Finnegan, Henderson, Farabow, Garrett, and Dunner, LLP (57) ABSTRACT

An engine controller, an engine control method, and a storage medium are provided. An intake valve closes after a compression stroke starts. One of a predetermined period before the compression stroke starts and a predetermined period after the intake valve closes is a first injection period and the other one is a second injection period. A pre-ignition prevention injection process controls an injector such that fuel corresponding to a requested injection amount is injected by dividing an injection period into the first injection period and the second injection period when a period required for fuel injection corresponding to the requested injection amount is longer than the first injection period.

13 Claims, 3 Drawing Sheets

ENGINE CONTROLLER, ENGINE CONTROL METHOD, AND STORAGE MEDIUM

1. FIELD

The present disclosure relates to an engine controller, an engine control method, and a storage medium.

2. DESCRIPTION OF RELATED ART

In vehicle on-board engines or the like, when the in-cylinder temperature increases (e.g., during a high-load operation or the like), an ignition plug or the like may become a hotspot to cause pre-ignition. In pre-ignition is, for example, mixed gas of fuel is self-ignited before ignition by an ignition plug due to a local high temperature inside a cylinder. Pre-ignition is one of abnormal combustions.

The engine controller disclosed in Japanese Laid-Open Patent Publication No. 2016-130473 suppresses pre-ignition by increasing the fuel injection amount or advancing the ignition timing to increase the combustion speed when the occurrence of pre-ignition is detected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an engine controller including control circuitry. The control circuitry controls an engine. The engine includes an injector that injects fuel into a cylinder. An intake valve closes after the compression stroke starts. One of a predetermined period before the compression stroke starts and a predetermined period after the intake valve closes is referred to as a first injection period, and the other one of the predetermined periods is referred to as a second injection period. The control circuitry of the engine controller is configured to perform a pre-ignition prevention injection process. The pre-ignition prevention injection process controls the injector such that fuel corresponding to a requested injection amount is injected by dividing an injection period into the first injection period and the second injection period when a period required for fuel injection corresponding to the requested injection amount is longer than the first injection period.

The upper portion of the cylinder of the engine includes components (e.g., the exhaust valve and the ignition plug) that are likely to become hot spots when the engine is operating. In the compression stroke, the piston moves upward in the cylinder to push up the intake air in the cylinder. When the intake valve is open, the intake air in the cylinder is discharged to the intake port. This generates an upward air flow in the cylinder. When the fuel is injected from the injector during a period in which such an air flow is generated in the cylinder, the fuel spray rides on the air flow and is directed upward in the cylinder. If the temperatures of the exhaust valve, the ignition plug, and the like is relatively high, the fuel spray comes into contact with the exhaust valve, the ignition plug, and the like having a relatively high temperature to ignite the fuel spray, which may cause pre-ignition. That is, in the engine in which the intake valve is closed after the compression stroke starts, pre-ignition is likely to occur when fuel is injected into the cylinder during a period from when the compression stroke starts (e.g., T2 in FIG. 3) to when the intake valve closes (e.g., IVC in FIG. 3).

The pre-ignition prevention injection process controls the injector such that fuel corresponding to the requested injection amount is injected by dividing the injection period into the first injection period and the second injection period when the fuel corresponding to the requested injection amount cannot be fully injected during the first injection period. That is, the pre-ignition prevention injection process performs fuel injection by avoiding a period during which pre-ignition is likely to occur when fuel is injected; that is, during the period from when the compression stroke starts (e.g., T2 in FIG. 3) to when the intake valve closes (e.g., IVC in FIG. 3). Thus, pre-ignition is unlikely to occur.

The fuel injection amount of the engine and normal control target values of the ignition timing are set to optimum values in terms of fuel efficiency and discharge capability. Thus, if the fuel injection amount is increased or the ignition timing is advanced, the fuel efficiency and the discharge capability of the engine deteriorate. The above configuration limits such deterioration.

Additionally, the control circuitry may execute the pre-ignition prevention injection process to control the injector such that the fuel corresponding to the requested injection amount is injected during the first injection period when the period required for the fuel injection corresponding to the requested injection amount is shorter than the first injection period. Even in a case in which the period required for fuel injection corresponding to the requested injection amount is shorter than the first injection period, executing the pre-ignition prevention injection process in the above manner allows fuel injection to be performed to avoid the period during which pre-ignition is likely to occur if the fuel is injected.

Depending on the operating state of the engine, pre-ignition may be unlikely to occur even if fuel is injected during the period from when the compression stroke starts to when the intake valve closes. Thus, the control circuitry of the engine controller may be configured to perform a determination process that determines whether pre-ignition is likely to occur. The control circuitry may perform the pre-ignition prevention injection process only when determining that the pre-ignition is likely to occur in the determination process. When the engine torque is relatively large or the engine coolant temperature is relatively high, the temperature in the cylinder becomes relatively high. Thus, pre-ignition is likely to occur. Accordingly, the control circuitry may be configured to determine whether pre-ignition is likely to occur in the determination process based on the engine torque and the engine coolant temperature. Even if fuel is injected during the period from when the compression stroke starts to when the intake valve closes, it is difficult for the spray to ride on the air flow in the cylinder if the fuel injection pressure is sufficiently high. In this case, pre-ignition is less likely to occur. Accordingly, the control circuitry may be configured to determine whether pre-ignition is likely to occur in the determination process based on the injection pressure of fuel from the injector.

The engine controller may be configured to set the first injection period to the predetermined period after the intake valve closes.

Another aspect of the present disclosure provides an engine control method for executing the same processes as those of the engine controller.

A further aspect of the present disclosure provides a non-transitory computer-readable storage medium that stores a control process that causes a processor to execute the same processes as those of the engine controller.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Figure 1:
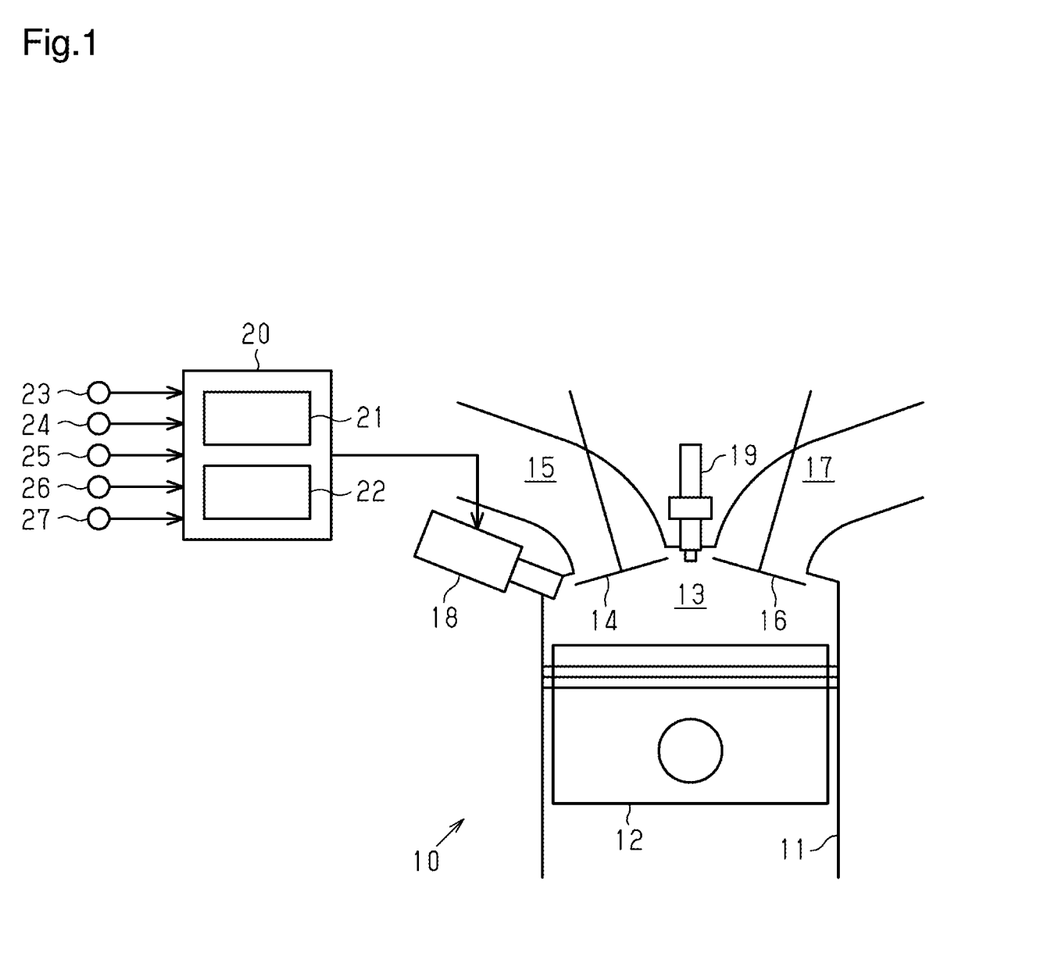
FIG. 1 is a diagram schematically illustrating the configuration of an engine controller according to an embodiment of the present disclosure.

An embodiment of an engine controller, an engine control method, and an engine control process will now be described in detail with reference to FIGS. 1 to 3.

Configuration of Engine Controller

First, the configuration of the engine controller according to the present embodiment will be described with reference to FIG. 1. An engine 10 to be controlled by the engine controller of the present embodiment is mounted on a vehicle. The engine 10 is a hydrogen gas engine that uses hydrogen gas as fuel.

The engine 10 includes a cylinder 11. A piston 12 is disposed in the cylinder 11 so as to reciprocate in the vertical direction in the figure. In the cylinder 11, a combustion chamber 13 that performs combustion is defined by the piston 12. An intake port 15 is connected to an upper portion of the cylinder 11 via an intake valve 14. An exhaust port 17 is connected to the upper portion of the cylinder 11 via an exhaust valve 16. An injector 18 that injects hydrogen gas into the cylinder 11 and an ignition plug 19 that ignites the hydrogen gas injected by the injector 18 are installed in the upper portion of the cylinder 11. The closing timing (e.g., IVC in FIG. 3) of the intake valve 14 in the engine 10 is set to be after the compression stroke starts (e.g., T2 in FIG. 3).

An electronic control unit 20 that controls the engine 10 is control circuitry including an arithmetic processing device 21 and a storage device 22. The storage device 22 stores programs and data used for control. The storage device 22 is an example of a non-transitory computer-readable storage medium. The arithmetic processing device 21 is a processor that performs various processes related to control of the engine 10 by executing the programs read from the storage device 22. In the present embodiment, the electronic control unit 20 corresponds to the engine controller.

The electronic control unit 20 is connected to a crank angle sensor 23, an air flow meter 24, a coolant temperature sensor 25, an accelerator pedal sensor 26, and a fuel pressure sensor 27. The crank angle sensor 23 detects a rotation phase of the crankshaft of the engine 10. The air flow meter 24 is a sensor that detects an intake air amount of the engine 10. The coolant temperature sensor 25 detects an engine coolant temperature THW, which is the temperature of coolant in the engine 10. The accelerator pedal sensor 26 detects an accelerator pedal operation amount ACC of the driver. The fuel pressure sensor 27 detects the pressure of the fuel supplied to the injector 18. The electronic control unit 20 obtains an engine speed NE, which is the rotation speed of the engine 10, from the detection result of the crank angle sensor 23. The electronic control unit 20 also determines an engine load factor KL based on the intake air amount detected by the air flow meter 24 and the engine speed NE. The engine load factor KL represents a filling factor of intake air in the combustion chamber 13. Further, the electronic control unit 20 obtains an injection pressure PF of the fuel from the injector 18 based on the detection result of the fuel pressure sensor 27 and the like. The electronic control unit 20 is connected to a sensor installed in each part of the vehicle in addition to the above sensors.

Fuel Injection Control

The electronic control unit 20 performs fuel injection control of the injector 18 as part of engine control. The fuel injection control will now be described in detail.

Figure 2:
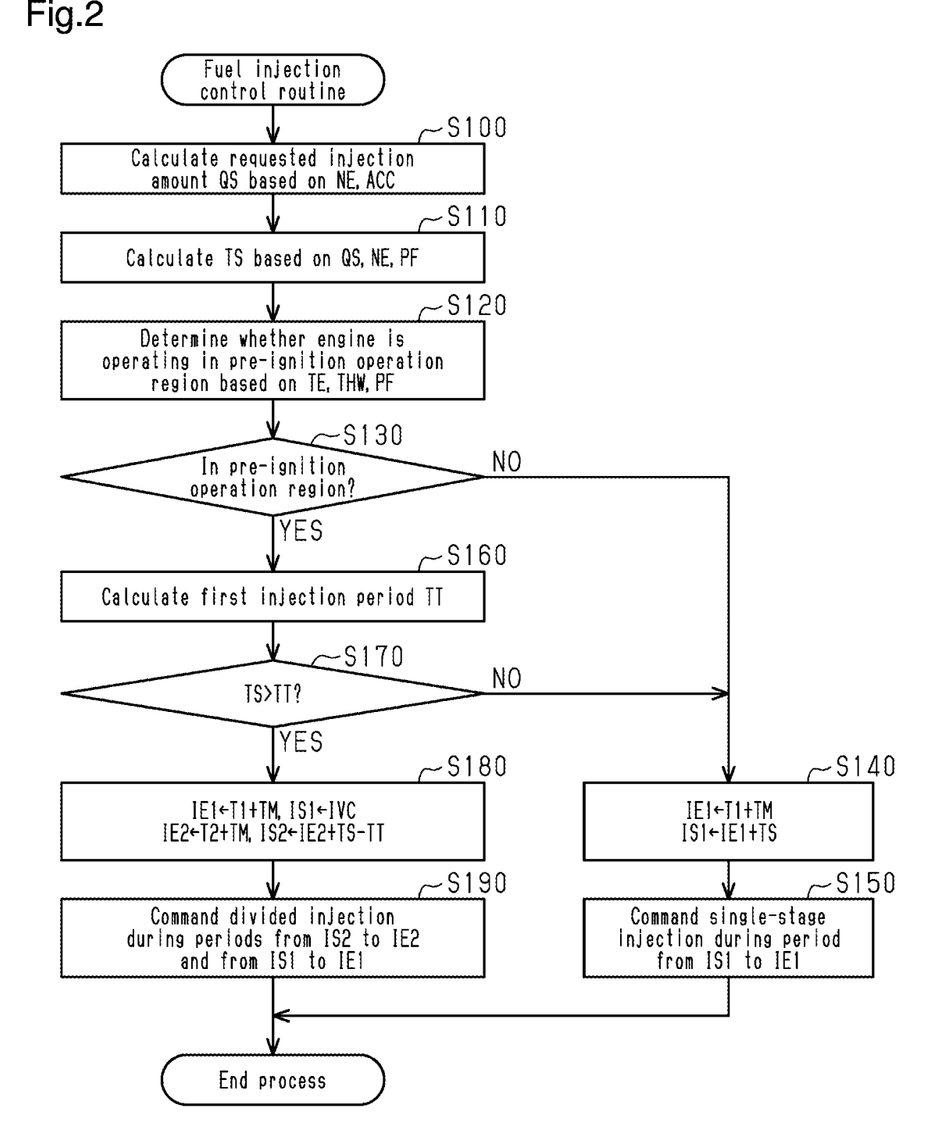
FIG. 2 is a flowchart illustrating a fuel injection control routine executed by the engine controller shown in FIG. 1.

FIG. 2 shows a flowchart illustrating a fuel injection control routine executed by the electronic control unit 20 for fuel injection control. When the engine 10 is operating, the electronic control unit 20 repeatedly executes the routine at predetermined control intervals. The value of each timing shown in FIG. 2 represents an advance amount of the crank angle from the compression top dead center. Thus, the timing when the value is relatively large is earlier than the timing when the value is relatively small. The values of the periods shown in FIGS. 2 and 3 each represent the rotation amount of the crankshaft in a corresponding period.

When this routine is started, in step S100, the electronic control unit 20 first calculates a requested injection amount QS based on the engine speed NE, the accelerator pedal operation amount ACC, and the like. The requested injection amount QS is a requested value of the hydrogen gas injection amount of the injector 18.

Subsequently, in step S110, the electronic control unit 20 calculates a required injection period TS based on the requested injection amount QS, the engine speed NE, and the injection pressure PF. The required injection period TS represents a value obtained by converting the time required for hydrogen gas injection corresponding to the requested injection amount QS into the rotation angle of the crankshaft at the current engine speed NE during the same time. The crank angle represents the rotation angle of the crankshaft, which is an output shaft of the engine 10. The injection rate of the hydrogen gas of the injector 18, that is, the injection amount of the hydrogen gas per unit time increases as the injection pressure PF increases. Thus, when the requested injection amount QS is constant and the engine speed NE is constant, the required injection period TS becomes longer as the injection pressure PF becomes lower. Further, the rotation angle of the crankshaft per unit time increases as the engine speed NE increases. Thus, when the requested injection amount QS is constant and the injection pressure PF is constant, the required injection period TS becomes shorter as the engine speed NE becomes higher.

Next, in step S120, the electronic control unit 20 determines whether the engine 10 is operating in a pre-ignition operation region. The pre-ignition operation region represents an operation region of the engine 10 in which pre-ignition is likely to occur. Pre-ignition is likely to occur when the ignition plug 19 or the exhaust valve 16 has a relatively high temperature. More fuel is burned in the cylinder 11 when the engine torque TE is relatively high than when the engine torque TE is relatively low. Thus, pre-ignition is more likely to occur when the engine torque relatively TE is relatively high than when the engine torque TE is relatively low. When the temperature of the ignition plug 19 or the exhaust valve 16 becomes higher, the engine coolant temperature THW also becomes higher. Thus, pre-ignition is more likely to occur when the engine coolant temperature THW is relatively high than when the engine coolant temperature THW is relatively low. As will be described later, pre-ignition is more likely to occur when the injection pressure PF is relatively low than when the injection pressure PF is relatively high. Thus, in the present embodiment, it is determined whether the engine 10 is operating in the pre-ignition operation region based on the engine torque TE, the engine coolant temperature THW, and the injection pressure PF.

When the engine 10 is not operating in the pre-ignition operation region (S130: NO), the electronic control unit 20 proceeds to step S140. Then, in step S140, the electronic control unit 20 sets the value of a first injection end timing IE1 to the value of a timing earlier than a final injection end timing T1 by an injection stopping margin TM (IE1<−T1+TM). Further, in step S140, the electronic control unit 20 sets the value of the first injection start timing IS1 to the value of a timing earlier than the first injection end timing IE1 by the required injection period TS (IS1<−IE1+TS). Then, in step S150, the electronic control unit 20 commands the injector 18 to perform a single-stage injection of the hydrogen-gas in a period from the first injection start timing IS1 to the first injection end timing IE1, and then ends the processes of this routine in the current control cycle.

The final injection end timing T1 is the end timing of an hydrogen-gas injection allowable period. In the present embodiment, the timing at which the piston 12 is positioned at the compression top dead center is set as the final injection end timing T1. A delay occurs from when the the electronic control unit 20 is commanded to stop injecting to when the injector 18 actually stops injecting hydrogen gas. The injection stopping margin TM represents a value obtained by converting the delay time of the injection stop into the rotation angle of the crankshaft in the delay time at the current engine speed NE. The electronic control unit 20 calculates the value of the injection stopping margin TM based on the engine speed NE.

When the engine 10 is operating in the pre-ignition operation region (S130: YES), the electronic control unit 20 proceeds to step S160. In step S160, the electronic control unit 20 calculates a first injection period TT. A period from the closing timing IVC of the intake valve 14 to the final injection end timing T1 is referred to as a period TO. The first injection period TT is a period obtained by subtracting the injection stopping margin TM from the period TO and expressed by a crank angle. The first injection period TT represents a period during which fuel can be injected after the intake valve 14 is closed. In the following step S170, the electronic control unit 20 determines whether the required injection period TS is longer than the first injection period TT. When the required injection period TS is less than or equal to the first injection period TT (S170: NO), the electronic control unit 20 proceeds to the above step S140. When the required injection period TS is longer than the first injection period TT (S170: YES), the electronic control unit 20 proceeds to step S180.

When advancing the process to step S180, the electronic control unit 20 sets the value of the first injection end timing IE1 to the value of a timing earlier than the final injection end timing T1 by the injection stopping margin TM (IE1<−T1+TM) in step S180. In step S180, the electronic control unit 20 sets the value of the first injection start timing IS1 to the value of the closing timing IVC of the intake valve 14 (IS1<−IVC). Further, in step S180, the electronic control unit 20 sets the value of the second injection end timing IE2 to a timing earlier than a start timing T2 of the compression stroke by the injection stopping margin TM (IE2<−T2+TM). Furthermore, in step S180, the electronic control unit 20 sets the second injection end timing IS2 to the value of a timing earlier than the second injection start timing IE2 by the difference between the required injection period TS and the first injection period TT (TS−TT) (IS2<−IE2+TS−TT). In the following step S190, the electronic control unit 20 commands the injector 18 to perform a divided injection for dividing the required injection period TS into the following two periods. The required injection period TS is divided into two periods in total: namely, a period from the second injection start timing IS2 to the second injection end timing IE2 and a period from the first injection start timing IS1 to the first injection end timing TE1 After the command, the electronic control unit 20 ends the processes of this routine in the current control cycle.

In the present embodiment, the processes of steps S140 to S190 in the fuel injection control routine correspond to a pre-ignition prevention injection process. The processes in steps S120 to S130 correspond to a determination process that determines whether pre-ignition is likely to occur.

Operation and Advantages of Present Embodiment

The operation and advantages of the present embodiment will now be described. In the following description, the period during which fuel can be injected after the closing timing IVC of the intake valve 14 is referred to as a first injection period. The period during which fuel can be injected before the start timing T2 of the compression stroke is referred to as a second injection period. In the present embodiment, the length of the first injection period is described as the first injection period TT.

Figure 3:
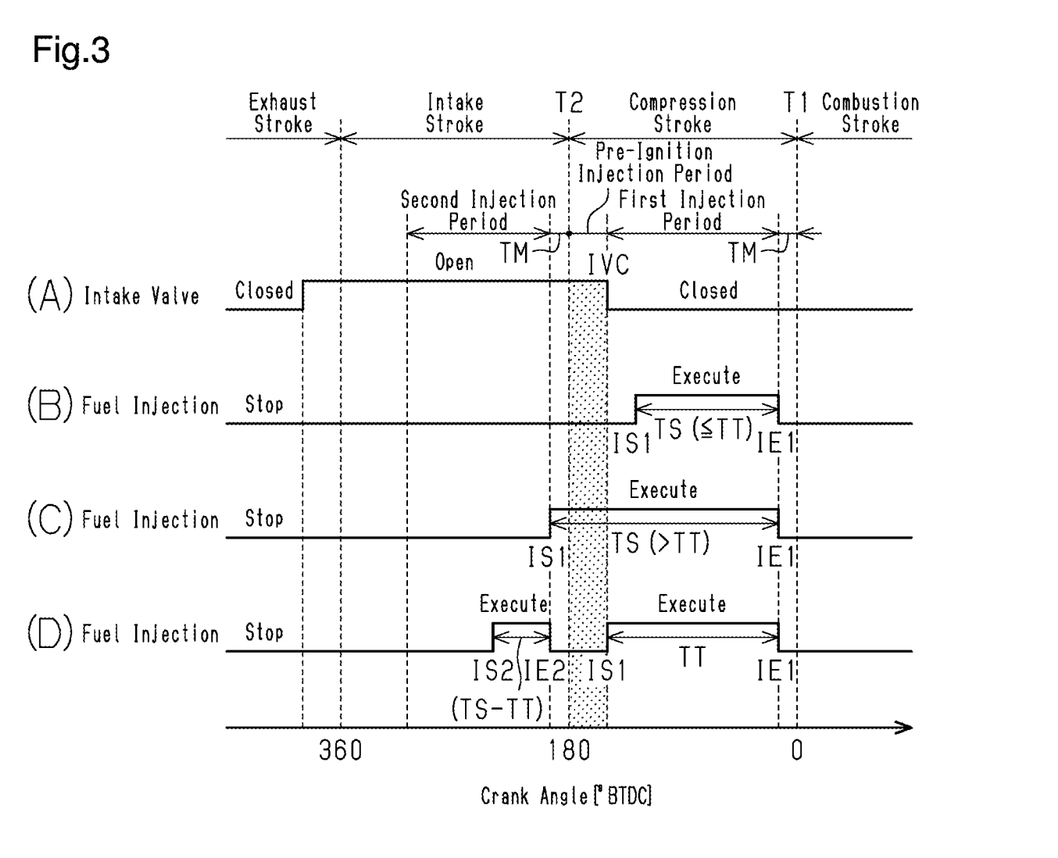
FIG. 3 includes sections (A) to (D), in which section (A) is a timing diagram illustrating an open-closed state of the intake valve shown in FIG. 1, section (B) is a timing diagram illustrating a state of executing fuel injection when the required injection period is less than or equal to the first injection period, section (C) is a timing diagram illustrating the state of executing fuel injection when the engine is not operating in the pre-ignition operation region and the required injection period is longer than the first injection period, and section (D) is a timing diagram illustrating the state of executing fuel injection when the engine is operating in the pre-ignition operation region and the required injection period is longer than the first injection period.

Section (A) of FIG. 3 shows changes in the open-closed state of the intake valve 14 in the engine 10. The numerical values on the horizontal axis in FIG. 3 represent the advance amount [° BTDC] (Before Top Dead Center) of the crank angle with respect to the end timing (T1) of the compression stroke. The period from when the piston 12 is positioned at the intake bottom dead center to when the piston 12 is positioned at the compression top dead center is defined as the compression stroke. As shown in section (A) of FIG. 3, the closing timing IVC of the intake valve 14 of the engine 10 is set to be later than the start timing T2 of the compression stroke. That is, in the engine 10, there is a period during which the intake valve 14 is open after the compression stroke starts (T2). When the intake valve 14 is open during the compression stroke in which the piston 12 moves upward in the cylinder 11, the intake air in the cylinder 11 pushed by the piston 12 is discharged to the intake port 15. This generates air flowing upward in the cylinder 11.

During a high-load operation of the engine 10 or the like, the ignition plug 19, the exhaust valve 16, or the like has a relatively high temperature. Thus, a hot spot serving as a fire source is formed in the upper portion of the cylinder 11. When the injector 18 injects hydrogen gas in the period during which the intake valve 14 is open in the compression stroke, spray is carried by the air flow and directed upward in the cylinder 11. Then, pre-ignition may occur when the spray comes into contact with the hot spot formed in the upper portion of the cylinder 11. In this manner, when hydrogen gas is injected during the period in which the intake valve 14 is open in the compression stroke, pre-ignition is likely to occur. In the following description, the period from the start timing T2 of the compression stroke to the closing timing IVC of the intake valve 14 is referred to as a pre-ignition injection period. The hatched area shown in FIG. 3 represents the pre-ignition injection period.

In step S170 of the fuel injection control routine shown in FIG. 2, the electronic control unit 20 determines whether the required injection period TS is longer than the first injection period TT. The required injection period TS represents a period required for fuel injection corresponding to the requested injection amount QS at the current engine speed NE and injection pressure PF. That is, in step S170, it is determined whether the period required for fuel injection corresponding to the requested injection amount QS is longer than the first injection period TT. When the required injection period TS is longer than the first injection period TT, the hydrogen gas corresponding to the requested injection amount QS cannot be fully injected within the first injection period TT. In this case, if the requested injection amount QS of hydrogen gas is to be injected at a time (i.e., if the requested injection amount QS of hydrogen gas is to be injected through the single-stage injection), hydrogen gas is injected during the pre-ignition injection period.

When the engine torque TE is relatively low or the engine coolant temperature THW is relatively low, the temperature of the ignition plug 19 or the exhaust valve 16 does not become high enough to ignite the spray. Thus, in such a case, even if hydrogen gas is injected during the pre-ignition injection period, pre-ignition is less likely to occur. In addition, the higher the injection pressure PF of the injector 18, the larger the momentum of the spray. Thus, when the injection pressure PF is greater than or equal to a certain level, the change in the traveling direction of the spray due to the air flow in the cylinder 11 is relatively small. Accordingly, pre-ignition is less likely to occur even if hydrogen gas is injected during the pre-ignition injection period.

In step S120 of FIG. 2, the electronic control unit 20 determines whether the engine 10 is operating in the pre-ignition operation region based on the engine torque TE, the engine coolant temperature THW, and the injection pressure PF. As described above, the pre-ignition operation region represents the operation region of the engine 10 in which pre-ignition is likely to occur. Thus, in step S120, the determination process is performed to determine whether pre-ignition is likely to occur based on the engine torque TE, the engine coolant temperature THW, and the injection pressure PF.

In the fuel injection control routine of FIG. 2, when it is determined in step S120 that be engine 10 is operating in the pre-ignition operation region (S130: YES), the electronic control unit 20 performs the determination in step S170. When the required injection period TS is less than or equal to the first injection period TT (S170: NO), the electronic control unit 20 performs the processes of steps S140 and S150. In this case, hydrogen gas is injected through the single-stage injection such that the single-stage injection ends at the first injection termination timing IE1.

Section (B) of FIG. 3 illustrates an example of how fuel injection is performed in this case. In this case, since the required injection period TS is shorter than the first injection period TT, the hydrogen gas injection corresponding to the requested injection amount QS is performed within the first injection period TT. Thus, in this case, the hydrogen gas injection during the pre-ignition injection period is not performed.

When determining in step S170 that the required injection period TS is longer than the first injection period TT, the electronic control unit 20 performs the processes of step S180 and step S190. In this case, the hydrogen gas injection is performed throughout the first injection period after the intake valve 14 is opened. Further, the divided injection of the hydrogen gas is performed so that the hydrogen gas corresponding to the shortage of the injection period (the amount of hydrogen gas that cannot be injected) is injected during the second injection period before the compression stroke starts.

Section (D) of FIG. 3 illustrates an example of how fuel injection is performed in this case. In this case, the period of injecting the hydrogen gas corresponding to the requested injection amount QS is divided into those before and after the pre-ignition injection period. Thus, also in this case, the hydrogen gas injection during the pre-ignition injection period is not performed.

When determining in step S120 that pre-ignition is not likely to occur (S130: NO), the electronic control unit 20 performs the hydrogen-gas injection through the processes in steps S140 and S150. In this case, regardless of whether the required injection period TS is longer than the first injection period TT, the hydrogen gas injection corresponding to the requested injection amount QS is performed through the single-stage injection.

Section (C) of FIG. 3 illustrates an example of the fuel injection in this case. In the example of section (C) of FIG. 3, the required injection period TS is longer than the first injection period TT. In this case, hydrogen gas is injected in a single stage regardless of whether the required injection period TS is longer than the first injection period TT. Thus, in this case, hydrogen gas may be injected during the pre-ignition injection period. However, in this case, even if hydrogen gas is injected during the pre-ignition injection period, pre-ignition is unlikely to occur.

The engine controller of the present embodiment provides the following advantages.

(1) In the present embodiment, the pre-ignition prevention injection process (S140 to S190) that controls the injector 18 is performed in the following manner. In the pre-ignition prevention injection process, when the period (TS) required for the fuel injection of the requested injection amount QS is shorter than the first injection period TT (S170: NO), the injector 18 is controlled to inject the fuel of the requested injection amount QS in the first injection period (S140 to S150). Further, in the pre-ignition prevention injection process, when the period required for the fuel injection of the requested injection amount QS is longer than the first injection period TT (S170: YES), the injector 18 is controlled so that the period of injecting fuel corresponding to the requested injection amount QS is divided into the first injection period and the second injection period (S180 to S190). As a result, hydrogen gas is not injected in the pre-ignition injection period during which pre-ignition is likely to occur. Thus, the engine controller of the present embodiment prevents the occurrence of pre-ignition.

(2) In the present embodiment, it is determined whether pre-ignition is likely to occur (S120 to S130). Only when it is determined that pre-ignition is likely to occur (S130: YES), the pre-ignition prevention injection process is performed. That is, when pre-ignition is not likely to occur (S130: NO), hydrogen-gas injection during the pre-ignition injection period is allowed. Thus, when the pre-ignition is not likely to occur (S130: NO), the single-stage injection is performed without performing the divided injection even if the required injection period TS is longer than the first injection period TT. The drive current of the injector 18 becomes larger at the start of injection. This limits power consumption for driving the injector 18 without performing the divided injection. In addition, the variations in the hydrogen gas injection rate of the injector 18 increase between the period immediately after the start of injection and the period immediately before the end of injection. Accordingly, the accuracy of the hydrogen gas injection amount is improved by reducing the number of injections without performing the divided injection. Furthermore, the reduction in the number of injections without performing divided injection limits wear of the nozzle seat due to seating of the nozzle at the end of injection of the injector 18.

(3) In the present embodiment, whether pre-ignition is likely to occur is determined based on the engine torque TE and the engine coolant temperature THW (S120 to S130). The hotspot in the cylinder 11 that causes pre-ignition is likely to be formed when the engine torque TE is relatively high or when the engine coolant temperature THW is relatively high. Thus, whether pre-ignition is likely to occur is accurately determined based on the engine torque TE and the engine coolant temperature THW.

(4) In the present embodiment, it is determined whether pre-ignition is likely to occur based on the injection pressure PF from the injector 18 (S120 to S130). When the injection pressure PF is relatively high, the momentum of the spray from the injector 18 is relatively large. Thus, the air flow in the cylinder 11 hardly changes the traveling direction of the spray. Accordingly, when the injection pressure PF is relatively high, pre-ignition is less likely to occur even if hydrogen gas is injected during the pre-ignition injection period. Hence, whether pre-ignition is likely to occur is accurately determined based on injection pressure PF.

(5) The engine 10 using hydrogen gas as fuel reduces the amount of NOx emission by performing ultra-lean combustion. When hydrogen gas is injected in the latter half of the compression stroke, a region having a high concentration of hydrogen gas is formed around the ignition plug 19. This ensures ignitability of hydrogen gas even when ultra-lean combustion is performed. The stirring of the hydrogen gas into the intake air progresses to a greater extent in the case in which the hydrogen gas is injected during the intake stroke than in the case in which the hydrogen gas is injected during the compression stroke. Thus, in the case in which ultra-lean combustion is performed by injecting hydrogen gas during the intake stroke, the hydrogen gas concentration around the ignition plug 19 does not reach the concentration required for ignition. As a result, misfire is likely to occur. In the present embodiment, in the pre-ignition prevention injection process, the hydrogen gas is injected in the second injection period during the intake stroke only when the hydrogen gas corresponding to the requested injection amount QS cannot be fully injected in the first injection period during the compression stroke. Accordingly, misfire during ultra-lean combustion is reduced.

The present embodiment may be modified as follows. The present embodiment and the following modifications can be combined as long as the combined modifications remain technically consistent with each other.

The pre-ignition prevention injection process may be performed by setting the first injection period to the predetermined period before the start (T2) of the compression stroke and setting the second injection period to the predetermined period after the closing (IVC) of the intake valve 14. That is, the pre-ignition prevention injection process may be performed in the following manner. First, when the required injection period TS is shorter than the period during which fuel can be injected before the start (T2) of the compression stroke, the requested injection amount QS of hydrogen gas is injected in the period during which fuel can be injected before the start (T2) of the compression stroke. When the required injection period TS is longer than the period during which fuel can be injected before the start (T2) of the compression stroke, the period of injecting the requested injection amount (QS) is divided into a period during which fuel can be injected before the start (T2) of the compression stroke and a period during which fuel can be injected after the intake valve 14 is closed (IVC). This avoids the hydrogen gas injection during the pre-ignition injection period and thus limits the occurrence of pre-ignition.

In the above embodiment, in the pre-ignition prevention injection process, when the required injection period TS is shorter than the first injection period TT (S170: NO), the requested injection amount QS is injected during the first injection period (S140 to S150). The smaller the requested injection amount QS, the shorter the required injection period TS. The lower the engine speed NE, the shorter the required injection period TS. Thus, when the required injection period TS is shorter than the first injection period TT, the engine 10 is operating at a relatively low rotation speed or a relatively low load. Hotspots are less likely to occur under low-speed or low-load operating conditions of the engine 10. Thus, in the pre-ignition prevention injection process, when the required injection period TS is shorter than the first injection period TT, the hydrogen-gas injection may be allowed in the period from the start (T2) of the compression stroke to the closing (IVC) of the intake valve 14.

The determination in step S120 of FIG. 2 may be made based on a combination of parameters other than the combination of the engine torque TE, the engine coolant temperature THW, and the injection pressure PF.

The fuel injection control routine may be executed without determining whether pre-ignition is likely to occur (S120 to S130). In this case, the pre-ignition prevention injection process is performed regardless of whether pre-ignition is likely to occur. That is, hydrogen gas injection is not performed during the pre-ignition injection period regardless of whether pre-ignition is likely to occur.

The fuel injection control in the above embodiment may be applied to an engine using fuel other than hydrogen gas.

The electronic control unit 20 included in the engine controller is not limited to one that includes the arithmetic processing device 21 and the storage device 22 and executes software processing. That is, the engine controller may have any one of the following configurations (a) to (c):

(a) The engine controller includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The engine controller includes one or more dedicated hardware circuits that execute various processes. Examples of the dedicated hardware circuits include an application specific integrated circuit (ASIC) and a field programmable gate array (FPGA).

(c) The engine controller includes a processor that executes part of various processes in accordance with a computer program and a dedicated hardware circuit that executes the remaining processes.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

In this specification, "at least one of A and B" should be understood to mean "only A, only B, or both A and B."

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An engine controller comprising control circuitry, wherein
the control circuitry is configured to:
control an engine, the engine including an injector that injects fuel into a cylinder, and an intake valve closing after a compression stroke starts, a predetermined period before the compression stroke starts is a second injection period and a predetermined period after the intake valve closes is a first injection period, and
perform a pre-ignition prevention injection process, wherein
the pre-ignition prevention injection process controls the injector such that fuel corresponding to a requested injection amount is injected by dividing an injection period into the first injection period and the second injection period when a period required for fuel injection corresponding to the requested injection amount is longer than the first injection period, and
a value of a start timing of the first injection period is set to a value of a closing timing of the intake valve.

2. The engine controller according to claim 1, wherein the pre-ignition prevention injection process controls the injector such that the fuel corresponding to the requested injection amount is injected during the first injection period when the period required for the fuel injection corresponding to the requested injection amount is shorter than the first injection period.

3. The engine controller according to claim 1, wherein
the control circuitry is further configured to perform a determination process that determines whether pre-ignition is likely to occur, and
the control circuitry is configured to perform the pre-ignition prevention injection process only when determining that the pre-ignition is likely to occur in the determination process.

4. The engine controller according to claim 3, wherein the determination process determines whether the pre-ignition is likely to occur based on an engine torque and an engine coolant temperature.

5. The engine controller according to claim 3, wherein the determination process determines whether the pre-ignition is likely to occur based on an injection pressure of fuel from the injector.

6. The engine controller according to claim 1, wherein the first injection period is a predetermined period after the intake valve closes.

7. The engine controller according to claim 1, wherein the engine is a hydrogen gas engine that uses hydrogen gas as fuel.

8. The engine controller according to claim 1, wherein the second injection period ends at least an injection stopping margin period before the compression stroke starts.

9. The engine controller according to claim 8, wherein the injection stopping margin period is based on a delay time for stopping the injector and an engine speed of the engine.

10. An engine control method executed by control circuitry, the engine control method comprising:
injecting fuel into a cylinder of an engine using an injector;
closing an intake valve after a compression stroke starts, wherein a predetermined period before the compression stroke starts is a second injection period and a predetermined period after the intake valve closes is a first injection period; and
executing a pre-ignition prevention injection process that controls the injector such that fuel corresponding to a requested injection amount is injected by dividing an injection period into the first injection period and the second injection period when a period required for fuel injection corresponding to the requested injection amount is longer than the first injection period,
wherein a value of a start timing of the first injection period is set to a value of a closing timing of the intake valve.

11. The engine control method cording to claim 10, wherein the engine is a hydrogen gas engine that uses hydrogen gas as fuel.

12. A non-transitory computer-readable storage medium that stores a program for causing a processor to execute an engine control process, the engine control process comprising:
injecting, by control circuitry, fuel into a cylinder of an engine using an injector;
closing, by the control circuitry, an intake valve after a compression stroke starts, wherein a predetermined period before the compression stroke starts is a second injection period and a predetermined period after the intake valve closes is a first injection period; and executing, by the control circuitry, a pre-ignition prevention injection process that controls the injector such that fuel corresponding to a requested injection amount is injected by dividing an injection period into the first injection period and the second injection period when a period required for fuel injection corresponding to the requested injection amount is longer than the first injection period, wherein a value of a start timing of the first injection period is set to a value of a closing timing of the intake valve.

13. The non-transitory computer-readable storage medium according to claim 8, wherein the engine is a hydrogen gas engine that uses hydrogen gas as fuel.

* * * * *